Patented Nov. 9, 1926.

1,606,624

UNITED STATES PATENT OFFICE.

ERNEST FOURNEAU AND JACQUES TRÉFOUËL, OF PARIS, FRANCE, ASSIGNORS TO ETABLISSEMENTS POULENC FRÈRES, OF PARIS, FRANCE.

MANUFACTURE OF A SYMMETRICAL UREIDE OF META-AMINOBENZOYL-META-AMINOMETHYLBENZOYL-1-NAPHTHYLAMINO-4-6-8-TRISULPHONATE OF SODIUM.

No Drawing. Application filed December 26, 1923, Serial No. 682,826, and in France November 14, 1923.

The preparation of coloring matters from amino-aryl-aminosulphonic acids is described in the German Patent No. 151,017.

The primary materials are formed of condensation products of nitrobenzoyl chloride or acetylaminobenzoyl chloride with aminonaphtholsulphonic acids.

Modifications of minor importance have been made in such processes by the Farbenfabriken vorm. Friedr. Bayer Co. (see German Patent 240,827). The preparation of the aminobenzoylated derivative is moreover described in German Patent 252,159. Finally, the action of phosgene upon certain amino complexes containing amino-naphthalene-sulphonic nuclei have been described in the German Patents 248,383 and 266,356. Subsequently the Farbenfabriken vorm. Friedr. Bayer Co. patented the preparation of a series of substances obtained by the action of phosgene upon derivatives of naphthylaminesulphonic acids or naphthylamine-phenolsulphonic acids. The bodies so obtained possess very marked trypanocidal properties. The first of these patents is 278,122; the others are respectively German Patents 291,351; 289,163; 284,938; 286,272; 288,273; 289,107; 289,270; 289,271 and 289,272.

The first substance of this series of ureas which has been recognized to have trypanocidal properties is the sodium salt of the urea compound known as the ureide of p-aminobenzoyl-1-8-aminonaphthol-4-6-disulphonic acid. In the patent in which it is described the statement is made that dilute solutions of this substance exert a very energetic curative action upon animals infested with trypanosomes. Further researches have shown that even if several of the substances described in the patent above cited possess a certain curative action upon trypanosomiasis, this action is relatively feeble and the most active of these substances does not exceed the ratio C/T=1/12 (C being the curative dose and T the dose tolerated). Most of the other bodies described either have a relatively feeble action or have no action at all. Finally, it is to be noted that the products described are very difficult to isolate; after the action of the phosgene, the ureas do not separate spontaneously; and even if large quantities of salt be added, the separation is far from complete.

This invention has for its object the preparation of a complex urea infinitely more active than those described and whose ratio is less than 1/160, i. e. while the dose tolerated is greater than 0.012 grams (a mouse weighing 20 grams), 0.000031 grams is sufficient to free mice from trypanosomes for several days and sometimes completely. With a dose of 0.00005 grams, the action is always complete. Moreover, a considerable improvement in the process described in the above cited patents has been brought about by extracting the final products with methyl alcohol. When the action of phosgene upon the aminobenzoylated derivatives has terminated, it is only necessary to evaporate to dryness and to redissolve the residue in anhydrous methyl alcohol. Under these conditions the active matter is isolated in solution together with traces of mineral salts. The methyl alcohol solution is evaporated and the residue redissolved in methyl alcohol; the filtered liquor is precipitated with ethyl alcohol. Under these conditions very pure substances are obtained which no longer form combinations when successively treated with sodium nitrite and naphthol or resorcin; moreover, all the active matter is extracted from the mixture in a state of nearly absolute purity.

This invention constitutes a very great advance over the processes described in the prior patents cited, both by reason of the enormous activity of the substance described and by reason of the method of preparing the substance. It relates exclusively to the preparation of the urea compound which may be called the ureide of m-aminobenzoyl-m-amino-p-methylbenzoyl-1-naphthyl-amino-4-6-8-trisulphonate of sodium and has the formula:

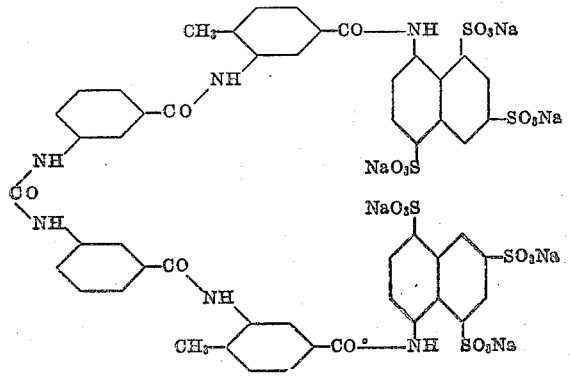

This substance is prepared in the following manner:

1. The first product of condensation, viz, aminomethylbenzoyl-1-naphthylamine trisulphonate of sodium, is obtained by following the method based upon the process described in the German Patents Nos. 151,017 and 240,827 with a mixture of: naphthylamine acid-4-6-8-trisulphonic acid (disodium salt) 9 grams; water, 40 cc.; sodium carbonate in a quantity sufficient for exact neutralization; sodium acetate, 5 grams.

These substances are heated in a water bath and there is added gradually with brisk agitation about 6 grams of 3-nitro-4-methylbenzoic acid chloride. The completion of the reaction is indicated by the disappearance of any tendency of the derivative to produce a diazo combination with resorcin in soda solution. The mixture is allowed to cool and then filtered. The product of condensation is precipitated with an excess of salt; it is dried in a centrifugal machine and washed in a concentrated solution of NaCl and dried.

2. To reduce the nitrated acid, it is dissolved in about 10 times its weight of water. 0.5 cc. of acetic acid is added and iron shavings to the extent of half of the weight of the nitrated derivative. Boil for 4 hours under a reflux condenser. Allow the mixture to cool and precipitate any iron dissolved with sodium carbonate and filter. The amine derivative is precipitated from the filtered liquor with an excess of NaCl. Acidify with Congo and precipitate with NaCl. Wash with a concentrated solution of NaCl and dry.

3. The product thus obtained is heated on a water bath and m-nitrobenzoic acid chloride is added gradually with brisk agitation. The product of condensation is separated by the addition of NaCl in excess; it is reduced with iron and acetic acid as indicated above and then subjected to the action of phosgene. This action of phosgene upon the amino derivative may take place without the necessity of separating the acid and even all the sequence of the reactions set out in paragraphs 1, 2, 3, from aminonaphthalene trisulphonic acid up to the condensation with phosgene may be carried out successfully without isolating the intermediate products.

When the reaction is complete, it will be noted that it is very difficult to separate the urea compound obtained with an excess of salt and a very small yield only can be obtained thereby, but by neutralizing with sodium carbonate the solution obtained by the final reaction, then evaporating the same and extracting the resulting product with methyl alcohol the whole of the urea compound formed can be obtained, nearly uncontaminated with mineral salts, which may, moreover, be freed therefrom by evaporating the liquor and again extracting with absolute methyl alcohol. The urea compound is dried in vacuo and is in the form of a greyish white powder very soluble in water and then producing yellow brown solutions; the powder is very soluble in methyl alcohol but insoluble in ordinary ethyl alcohol. The product has an extremely strong action upon trypanosomiasis; a mouse weighing 20 grams easily tolerates a dose of 0.010–0.012 grams of the urea compound while 0.000031 grams is sufficient to free the animal from trypanosomes, sometimes completely.

We claim:—

1. The process of preparing a pure symmetrical ureide of m-amino-benzoyl-m-amino-p-methylbenzoyl-1-naphthylamino-4-6-8-trisulphonate of sodium, consisting in the action of 3-nitro-4-methylbenzoylchloride on the trisodium salt of 1-naphthyl-animo-4-6-8-trisulphonic acid, reducing the product thus produced to form aminobenzoyl-naphthyl-aminotrisulphonate of sodium, reacting upon this compound with meta-nitrobenzoyl-chloride, reducing the resulting product to form m-aminobenzoyl-m-amino-p-methyl-benzoyl-1-napthylamino-4-6-8-trisulphonate of sodium, reacting upon this compound with phosgene to produce the ureide of said compound, extracting the mixture containing the said ureide with methyl alcohol, filtering the extract and evaporating the filtrate, re-extracting with methyl alcohol, and precipitating the said ureide in a pure form of ethyl alcohol.

2. A trypanosomicide comprising a symmetrical ureide of m-aminobenzoyl-m-amino-p-methylbenzoyl-1-naphthyl-amino-4-6-8 trisulfonate of sodium.

JACQUES TREFOUEL.
ERNEST FOURNEAU.